Patented July 23, 1940

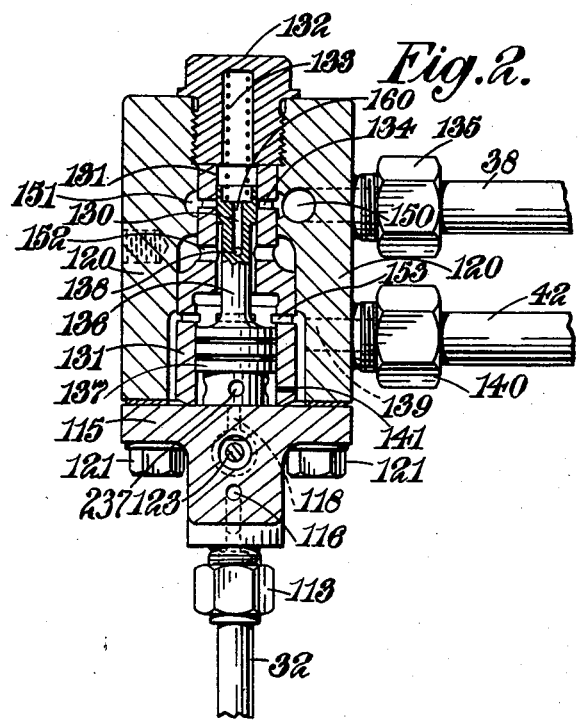
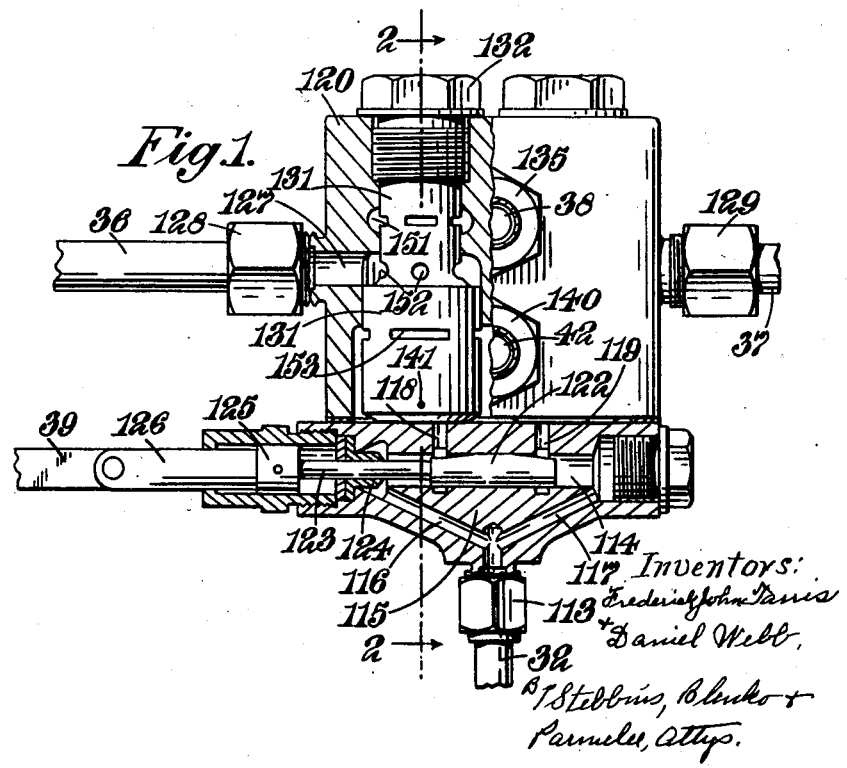

2,208,820

UNITED STATES PATENT OFFICE 2,208,820

VALVE FOR HYDRAULIC SYSTEMS

Frederick John Tarris and Daniel Webb, London, England, assignors to The India Rubber, Gutta Percha and Telegraph Works Company Limited, London, England, a British company Application October 23, 1937, Serial No. 170,709
In Great Britain November 3, 1936

5 Claims. (Cl. 137—153)

The present invention comprises improvements in or relating to valves for use in hydraulic systems, and has for its object the provision of a valve which can be utilised to permit operation of a hydraulic motor connected to the valve to an extent or at a speed which can be determined at will by the operator.

According to the invention, a regulating valve for a hydraulic system comprises a movable element, or elements, controlling inlet and outlet ports for the valve and such as to be subject to the pressure of the operating fluid of the system, and means to apply an adjustable load to the element or elements in opposition to the said pressure to regulate the movement of the element or elements.

Preferably, such a regulating valve comprises also an exhaust port controlled by the movable element or elements, and according to one preferred form of construction the regulating valve comprises also a movable element in the form of a hollow piston or sleeve valve mounted for longitudinal movement under endwise pressure exerted by the operating fluid or by the means to apply a variable load to the element in opposition to said endwise pressure. The means last referred to conveniently comprises a hydraulic regulating valve serving to regulate a fluid pressure which is applied to the element or elements in opposition to that of the operating fluid of the hydraulic system controlled by the first-mentioned valve.

A valve constructed in accordance with the invention may be used in any hydraulic system, but is found to be of particular use in a system utilising a hydraulic liquid and comprising a reservoir for the liquid and a pump fed from the reservoir for supplying liquid under pressure through the regulating valve to the hydraulic motor that is to be operated. Such a hydraulic system is conveniently employed for effecting the operation of one or more auxiliary devices, such as brakes, in vehicles or aircraft.

In order that the invention may be more clearly understood a preferred form of regulating valve will be described by way of example with reference to the accompanying drawing in which:

Figure 1 is a plan view, with certain parts shown in section, of a device incorporating the regulating valve, and Figure 2 is a section looking in the direction of the arrows on the line 2—2 of Figure 1.

Like reference numerals are employed to denote like parts in the various figures of the drawing.

The regulating valve which is shown in the drawing is incorporated in a device which is conveniently used in controlling the operation of aircraft brakes in a hydraulic system which may, for example, be similar to that described in co-pending United States Patent application Serial No. 170,710. The control device conveniently comprises a casting 120 of light metal alloy containing a pair of regulating valves for controlling the braking pressure in aircraft wheel brakes respectively associated with the brakes on opposite sides of the central fore-and-aft plane of symmetry of the craft. One such regulating valve is shown in section in Figure 2 and serves to control the passage of pressure fluid from a conduit 38 to which the pump or other source of pressure fluid is connected. The conduit 38 communicates with a passage 150 in the casting 120 leading to an annular groove 151 in a bore in the casting 120. The bore including the annular groove 151 has located in it a liner 131 which encloses the regulating valve constructed in accordance with the invention. A similar regulating valve is enclosed in a liner contained in a parallel bore similarly communicating with the passage 150.

The liner 131 has radial slots or perforations 134 adjacent the annular groove 151 and normally covered by a hollow piston valve 130 subject to the action of a light compression spring 133 located between the piston and an end closure 132 retaining the sleeve 131 in place within the bore of the casting 120.

The hollow piston has a central bore 160 communicating through ports 138 with the space surrounding a mid-portion 136 of the piston valve of reduced diameter. The said space communicates through further ports 152 in the sleeve 131 with a lateral aperture 127 in the casting 120 communicating with a fluid conduit 36 by means of the connection 128. The fluid conduit 36 communicates with the brake mechanism to be operated by fluid pressure and to be subject to the control of the valve shown in Figure 2.

The space surrounding the reduced central portion 136 of the hollow piston valve also communicates with further lateral apertures 153 in the sleeve 131, and the apertures 153 in turn communicate with a lateral opening 139 in the casting 120 connected to a conduit 42 by means of a coupling 140. The conduit 42 represents an exhaust conduit which conveniently constitutes a return line to the pump representing the source of fluid pressure or to a fluid reservoir providing a fluid supply for such a pump. A conduit 37 is conveniently also secured to the casting 120 by means of the coupling 129 for effecting communication between wheel brakes of the aircraft located on the opposite side of the central line of the craft to those connected to the conduit 36. The passage of fluid pressure to the conduit 37 is controlled by a second regulating valve exactly similar to that which has previously been described and connected in common to the supply and exhaust conduits 38 and 42.

The regulating valves are actuated by effecting a longitudinal movement of the piston valve, the reduced central portion 136 of which carries at that part remote from the end 130 controlling the apertures 134, a second piston 137 serving to control the apertures 153. A longitudinal movement of the piston from the position shown in Figure 2 against the action of the compression spring 133 will serve to establish communication between the conduit 38 through the aperture 134, the space surrounding the reduced portion 136 of the piston, and apertures 152 with the lateral outlet 127 and conduit 36 so that fluid pressure supplied by the conduit 38 passes to the brake mechanism connected to the conduit 36. Such movement of the piston valve also cuts off communication between the space surrounding the central reduced portion 136 of the piston and the outlet apertures 153 communicating with the exhaust conduit 42.

It is to be appreciated, however, that at all positions of the piston valve the fluid pressure of the hydraulic system controlled by the valve is also applied to one end of the piston valve, owing to communication between the space surrounding the reduced portion 136 and the bore 160 through the ports 138 in said portion. When this pressure is sufficient to overcome that applied to the piston 137 (in opposition to the action of the compression spring 133) to open the valve, the valve will automatically close to cut off further supply of pressure fluid from the conduit 38. If desired, the dimensions of the valve can be arranged so that such closing movement will not be sufficient to open the outlet ports 153 to place them in communication with the conduit 36 until the pressure initially securing operation of the valve is removed from the end of the piston 137 to permit a further return movement of the valve.

In the device shown in Figures 1 and 2 the operating pressure applied to the piston 137 is exerted over the total end area of the piston 137 due to the apertures 237. The operating pressure is constituted by a hydraulic pressure passing through the aperture 118 in the casting 115 secured to the casting 120 by means of the screws 121. A similar aperture 119 is provided for supplying pressure fluid to one end of the regulating valve controlling the brake mechanisms connected to the conduit 37. Fluid pressure is supplied to the openings 118, 119 from a central bore 114 in the casting 115, the central bore 114 being supplied at each end from the conduits 116 and 117 with pressure fluid from the supply conduit 32 secured to the casting 115 by means of the coupling 113. A control valve in the conduit 32 thus serves to secure operation of the regulating valves located in the casting 120 by supplying pressure fluid through the apertures 118 and 119 to act on the piston 137 and the corresponding piston of the other regulating valve.

It has already been indicated that pressure will build up in the conduits 36 and 37 when the regulating valve is open only until it is sufficient to overcome the pressure applied to the piston 137. By controlling the latter pressure therefore a similar control is effected of the pressure in the conduits 36 and 37 since the pressure in these conduits is always acting upon the piston valves 130 in opposition to the operating pressure applied to the piston 137.

In the control device shown in Figures 1 and 2 the bore 114 also contains a piston valve 122 having chamfered ends located adjacent the apertures 118 and 119, and no claim to this form of valve as such is made in the present application.

The valve 122 has a stem 123 passing through a packing 124 to a slide 125 moving in a suitable guide secured to the casting 115. The slide 125 communicates by means of the extension 126 with a link 39 which, for example, may conveniently be secured to the rudder bar or equivalent mechanism of the aircraft in which the present form of control device is located. It will be appreciated that by movement of the link 39 to move the valve member 122, a differential control is effected of the pressure fluid passing through the apertures 118 and 119. By this means a differential control of the fluid pressure in the conduits 36 and 37 and of the brakes actuated thereby is secured. In the construction shown in Figures 1 and 2 a leakage port 141 provided in the sleeve 131 so that a constant circulation of fluid from the supply line 32 to the exhaust conduit 42 is maintained when the regulating valve is in operation.

It will be noted, however, that the valve may be employed not only in a hydraulic system in which a continuous circulation of operating fluid is obtained, but in one employing fluid stored under pressure which is passed through the valve to the hydraulic system controlled thereby.

Modifications in the actual structure of the valve which has been described may be effected; for example, the movable element serving to regulate the passage of pressure fluid to the auxiliary device (represented by a brake mechanism) may be formed in two or more parts or may be replaced by two or more separate movable elements. Again, satisfactory operation of the valve takes place without the use of the spring 133.

We claim:

1. Apparatus for producing two differentially adjustable and controllable hydraulic pressures comprising a pair of valves to regulate hydraulic pressures passed thereby whereof each valve has a casing with inlet and outlet ports, at least one valve element movably mounted in the casing to control communication between the inlet and outlet ports, and means to subject the valve element to the hydraulic pressure passed by the valve, in combination with means to apply an adjustable fluid pressure to the movable element of both valves in opposition to that applied to the elements by the hydraulic pressures passed by the valves to control the movement of the said elements, and with means also to effect a differential adjustment of the adjustable fluid pressures respectively serving to control the pair of valves, each of said valve casings being formed to permit the application of the adjustable fluid pressure directly to the movable valve element and having a further port for the exhaust of the said pressure so located that a continuous flow of pressure fluid through the valve casing takes place when the said pressure is in effective operation on the valve element.

2. Apparatus for producing two differentially adjustable and controllable hydraulic pressures comprising a pair of valves to regulate hydraulic pressures passed thereby whereof each valve has a casing with inlet and outlet ports, at least one valve element movably mounted in the casing to control communication between the inlet and outlet ports, and means to subject the valve element to the hydraulic pressure passed by the valve, in combination with means to apply an adjustable fluid pressure to the movable element of both valves in opposition to that applied to the elements by the hydraulic pressures passed by the valves to control the movement of the said elements, and a regulating valve for controlling and effecting adjustment of the adjustable fluid pressures applied to the valve elements.

3. Apparatus for producing two differentially adjustable and controllable hydraulic pressures comprising a pair of valves to regulate hydraulic pressures passed thereby whereof each valve has a casing with inlet and outlet ports, at least one valve element movably mounted in the casing to control communication between the inlet and outlet ports, and means to subject the valve element to the hydraulic pressure passed by the valve, in combination with means to apply an adjustable fluid pressure to the movable element of both valves in opposition to that applied to the elements by the hydraulic pressures passed by the valves to control the movement of the said elements, and a compound valve to control the adjustable fluid pressures applied to the valve elements, which compound valve affords a single operating element movement of which secures differential adjustment of the said fluid pressures.

4. Apparatus for producing two differentially adjustable and controllable hydraulic pressures comprising a pair of valves to regulate hydraulic pressures passed thereby whereof each valve has a casing with inlet and outlet ports, at least one valve element movably mounted in the casing to control communication between the inlet and outlet ports, and means to subject the valve element to the hydraulic pressure passed by the valve, in combination with means to apply an adjustable fluid pressure to the movable element of both valves in opposition to that applied to the elements by the hydraulic pressures passed by the valves to control the movement of the said elements, a regulating valve for controlling and effecting adjustment of the adjustable fluid pressures applied to the valve elements, and a compound valve to control the adjustable fluid pressures applied to the valve elements, which compound valve affords a single operating element the movement of which secures differential adjustment of the said fluid pressures.

5. Apparatus for producing two differentially adjustable and controllable hydraulic pressures comprising a pair of valves to regulate hydraulic pressures passed thereby whereof each valve has a casing with inlet and outlet ports, at least one valve element movably mounted in the casing to control communication between the inlet and outlet ports, and means to subject the valve element to the hydraulic pressure passed by the valve, in combination with means to apply an adjustable fluid pressure to the movable element of both valves in opposition to that applied to the elements by the hydraulic pressures passed by the valves to control the movement of the said elements, a compound valve to control the adjustable fluid pressures applied to the valve elements, which compound valve comprises a valve casing having a pair of outlet openings for pressure fluid passing to the pair of valves, and a movable valve element slidably mounted in the casing and having chamfered ends located adjacent the outlet openings differentially to adjust fluid pressures passing therethrough by movement of the chamfers relatively to the outlet openings.

FREDERICK JOHN TARRIS.
DANIEL WEBB.